United States Patent [19]
Kim

[11] Patent Number: 5,815,478
[45] Date of Patent: Sep. 29, 1998

[54] METHOD OF DRIVING A CD-ROM DRIVE

[75] Inventor: Hong-jang Kim, Suwon, Rep. of Korea

[73] Assignee: Samsung Electronics Co., Ltd., Kyungki-Do, Rep. of Korea

[21] Appl. No.: 844,655

[22] Filed: Apr. 21, 1997

[30] Foreign Application Priority Data

May 14, 1996 [KR] Rep. of Korea .................. 1996-15981

[51] Int. Cl.$^6$ .................................................. G11B 7/00
[52] U.S. Cl. .................................................. 369/50
[58] Field of Search ................................ 369/50, 47, 32, 369/124, 48

[56] References Cited

U.S. PATENT DOCUMENTS 5,528,574   6/1996   Takeuchi et al. ......................... 369/50
5,636,192   6/1997   Shimizume et al. ..................... 369/50

Primary Examiner—Nabil Hindi
Attorney, Agent, or Firm—Sughrue, Mion, Zinn, Macpeak & Seas, PLLC

[57] ABSTRACT

A method of driving a CD-ROM drive is provided which includes the steps of setting an initial driving speed of a disk to a predetermined N× speed, and measuring a length of time t required for generating a correction error signal (CES) of a digital signal processor (DSP) while playing the disk at the predetermined N× speed. If it is determined that the measured CES generation time t is smaller than a first reference time $t_1$, then the disk is played at N× speed. If it is determined that the CES generation time t is equal to or greater than the first reference time $t_1$, and smaller than a second reference time $t_2$, the disk is played at (N−2)×speed. If it is determined that the CES generation time t is equal to or greater than an (n−1)th reference time $t_{n-1}$ and smaller than an nth reference time $t_n$ after the algorithm is sequentially repeated for all reference times between $t_1$ and $t_n$, the disk is played at 2× speed. If the CES generation time t is equal to or greater than the nth reference time $t_n$, the playing of the disk is stopped.

17 Claims, 2 Drawing Sheets

METHOD OF DRIVING A CD-ROM DRIVE

BACKGROUND OF THE INVENTION

1. Field of the Invention

The present invention relates to a compact disk-read only memory (CD-ROM) drive, and more particularly, to a method of driving a CD-ROM drive whereby the drive system can be stably operated when an off-centered disk is played by the CD-ROM drive. The present application is based upon Korean Application No. 96-15981, which is incorporated herein by reference.

2. Description of the Related Art

A CD-ROM is a storage medium which has a diameter of 12 cm and a capacity of 680 MB, and can reproduce recorded data, such as data of a conventional music CD, using a laser beam. A CD-ROM drive for driving the CD-ROM conventionally controls data access of a pick-up via four types of servo controls. A focus servo controls the focal position of the pick-up to accurately focus a laser beam on the disk having digital information signals recorded thereon as pits, and corrects vibrations in the vertical direction. A tracking servo controls the position of the laser beam to move the laser beam along the track of the disk and corrects the off-centeredness of the disk. A sled servo controls a motor in a sled driving apparatus for transferring a pickup from an inner circumference of the disk to an outer circumference thereof and allows the pickup to track a spiraling track on the disk. A spindle servo controls the phase of the disk and the rotation thereof at a constant linear velocity.

FIG. 1 shows a configuration of a conventional CD-ROM drive system. A spindle motor 12 rotates a disk 11 seated on a turntable 10. A pickup 13 reads information recorded on the disk 11 using a laser beam. A sled motor (not shown) and a sled driving shaft 14 rectilinearly reciprocate the pickup 13. A microcomputer 15 controls the entire drive system. A digital signal processor (DSP) 16 receives a predetermined control command from the microcomputer 15 and outputs a signal for driving the spindle motor 12. A servo signal processor (SSP) 17 receives a predetermined signal from the pickup 13 and transmits the same to the microcomputer 15. A ROM decoder 18 transmits information received from the DSP 16 to a separate host computer through a PC interface 19.

The spindle motor 12 is generally driven at a predetermined multiple speed. For example, in the case of a 8× speed drive, the spindle motor 12 is driven at eight times the original speed. Almost all disks are played only at a multiple speed. In the case of a CD-ROM which is recorded in accordance with the moving pictures experts group (MPEG) standard, when the initial speed of the disk is set at N× speed, the disk is always played at N× speed. However, the driving of the CD-ROM drive is greatly influenced by the condition of the disk. Particularly, in the case of a severely off-centered disk, the DSP 16 having an error correcting function is not sufficient to correct the error. Therefore, various problems such as generation of a mosaic phenomenon on a monitor, a lead-in defect on the disk, and vibrations in the drive itself may occur.

SUMMARY OF THE INVENTION

To overcome the above problems, it is an object of the present invention to provide a CD-ROM drive driving method whereby the drive system can be stably operated even when a severely off-centered disk is played by the CD-ROM drive.

To accomplish the above object, there is provided a method of driving a CD-ROM drive, comprising the steps of:

(a) setting an initial driving speed of the disk to N× speed, where N=2n and n is a positive integer;

(b) measuring a length of time (t) required for generating a correction error signal (CES) of a digital signal processor (DSP) while playing the disk at N× speed;

(c) determining whether the measured CES generation time t is smaller than a first reference time $t_1$;

(d) playing the disk at N× speed if it is determined in step (c) that the CES generation time t is smaller than the first reference time $t_1$;

(e) determining whether the CES generation time t smaller than a second reference time $t_2$ if it is determined in step (c) that the CES generation time t is equal to or greater than the first reference time $t_1$;

(f) playing the disk at (N−2)× speed if it is determined in step (e) that the CES generation time t is equal to or greater than the first reference time $t_1$ and smaller than a second reference time $t_2$;

(g) determining whether the CES generation time t is equal to or greater than the second reference time $t_2$ and smaller than a third reference time $t_3$ if it is determined in step (e) that the CES generation time t is equal to or greater than the second reference time $t_2$;

(h) determining whether the CES generation time t is equal to or greater than a reference time $t_{n-1}$ and smaller than a reference time $t_n$ after the algorithm is sequentially repeated for all reference times between $t_1$ and $t_n$;

(i) playing the disk at 2× speed if it is determined in step (h) that the CES generation time t is equal to or greater than the reference time $t_{n-1}$ and smaller than the reference time $t_n$; and (j) stopping the playing of the disk if it is determined in step (h) that the CES generation time t is equal to or greater than the reference time $t_n$.

According to the method of the present invention, the driving mode of a spindle motor in the disk drive is appropriately changed according to the condition of the disk. Therefore, conventional problems such as generation of a mosaic phenomenon, a lead-in defect, and vibrations can be prevented to thereby stabilize the drive system.

BRIEF DESCRIPTION OF THE DRAWINGS

The above object and advantages of the present invention will become more apparent by describing in detail a preferred embodiment thereof with reference to the attached drawings in which.

DETAILED DESCRIPTION OF THE INVENTION

Figure 1:
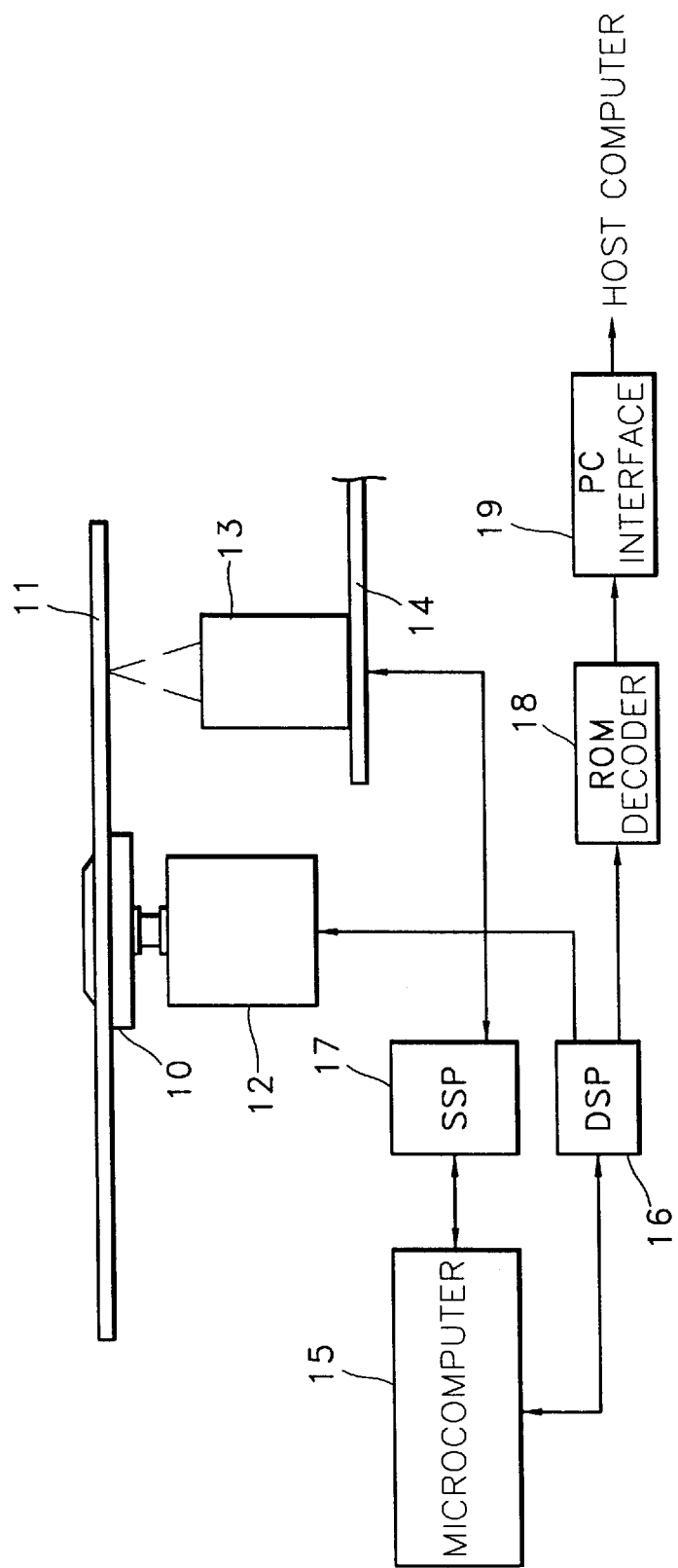
FIG. 1 is a schematic diagram illustrating the structure of a conventional CD-ROM disk system.
Figure 2:
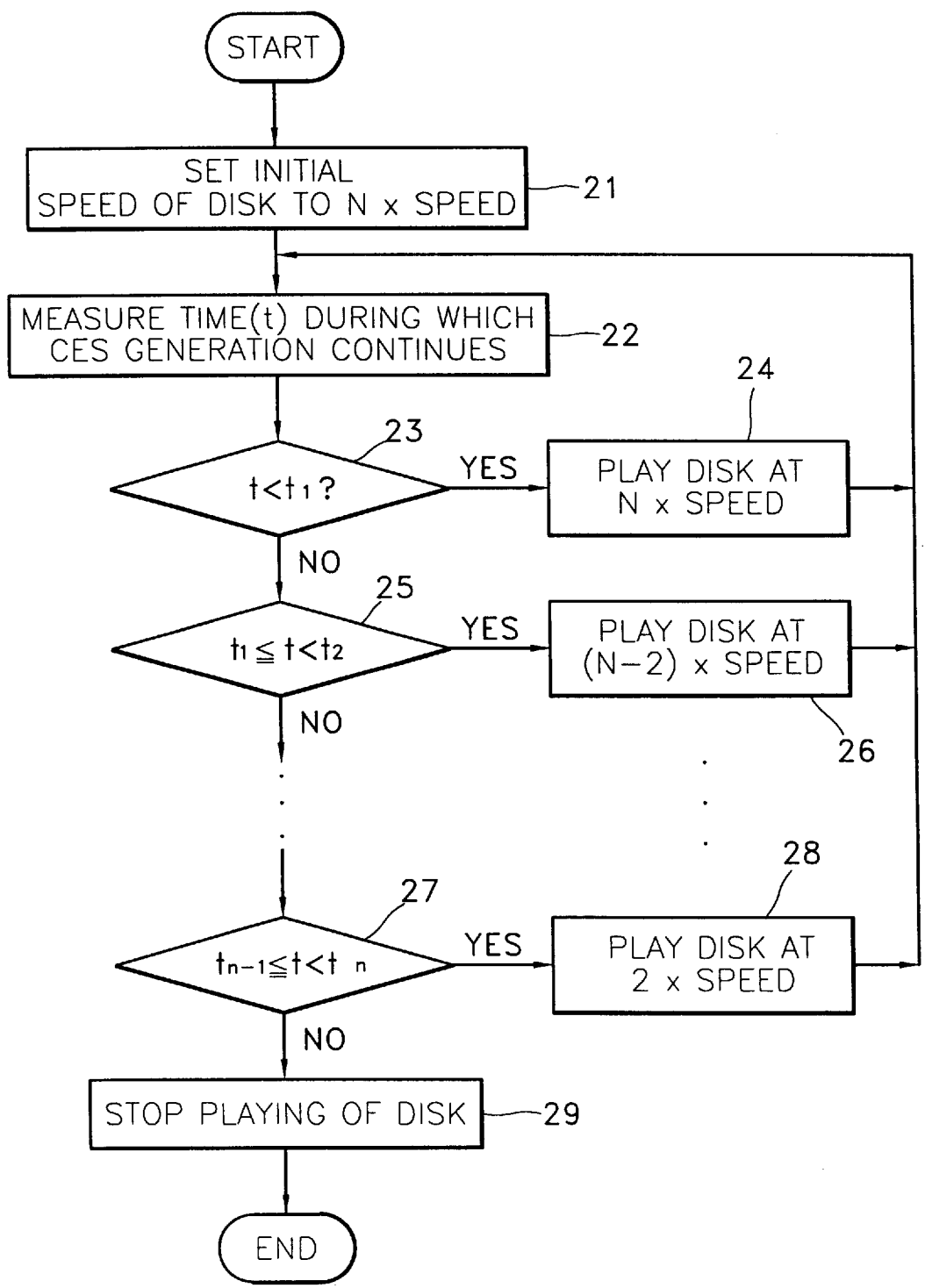
FIG. 2 is a flowchart illustrating a CD-ROM drive driving method according to the present invention.

Referring to FIGS. 1 and 2, in a CD-ROM drive driving method according to the present invention, the initial driving speed of a disk 11 inserted into the disk drive is set to N× speed, where N=2n and n is a positive integer, and where the minimum playing speed of the disk drive is 2× speed, in step 21. Here, the initial speed is set by a microcomputer 15. A program for setting the initial speed of disks to be inserted into the disk drive to a predetermined N× speed is pre-stored in the microcomputer 15.

After the disk is set to the predetermined N× speed (e.g., a 4× speed), a length of time t required for generating a correction error signal (CES) of a DSP 16 is measured by a counter installed in the CD-ROM drive while the disk is played at the predetermined multiple speed, in step 22. Thereafter, a determination of whether the measured CES generation time t is smaller than a first reference time $t_1$ is made in step 23. If the CES generation time t is smaller than the first reference time $t_1$, the disk is played at N× speed in step 24. At this time, the driving mode of the spindle motor 12 in the disk drive is maintained at N× speed.

Meanwhile, if it is determined in step 23 that the CES generation time t is equal to or greater than the first reference time $t_1$, a determination of whether the CES generation time t is equal to or greater than the first reference time $t_1$ and smaller than a second reference time $t_2$ is made in step 25. If the CES generation time t is equal to or greater than the first reference time $t_1$ and smaller than the second reference time t2, the disk is played at (N−2)× speed in step 26. If it is determined in step 25 that the CES generation time t is equal to or greater than the second reference time $t_2$, a determination of whether the CES generation time t is equal to or greater than the second reference time $t_2$ and smaller than a third reference time $t_3$ is made (step not shown). After the algorithm is sequentially repeated, a determination of whether the CES generation time t is equal to or greater than an (n−1)th reference time $t_{n-1}$ and smaller than an nth reference time $t_n$ is made in step 27. If the CES generation time t is equal to or greater than the (n−1)th reference time $t_{n-1}$ and smaller than the nth reference time $t_n$, the disk is played at 2× speed in step 28. Also, if the CES generation time t is equal to or greater than the nth reference time $t_n$, the playing of the disk is stopped in step 29.

It should be apparent that the relationship between the reference time values is as follows: $t_1 < t_2 < t_3 < \ldots t_{n-1} < t_n$. The values of $t_1, t_2, \ldots, t_{n-1}$, and $t_n$ are determined based on simulations and experiments repeatedly carried out with regard to the length of time required to generate a correction error signal (CES).

According to the CD-ROM drive driving method of the present invention as described above, the speed of a disk player is appropriately determined depending on the condition of the disk, and the driving mode of a spindle motor in the disk drive is appropriately changed depending on the condition of the disk. Therefore, conventional problems such as generation of a mosaic phenomenon, a lead-in defect, and vibrations can be prevented, and the drive system can thereby be stably operated.

While only certain embodiments of the invention have been specifically described herein, it will apparent that numerous modifications may be made thereto without departing from the spirit and scope of the invention.

What is claimed is:

1. A method of driving a CD-ROM drive for playing a disk, comprising the steps of:
   (a) setting an initial driving speed of the disk to N× speed, where N=2n and n is a positive integer;
   (b) measuring a length of time t required to generate a correction error signal (CES) of a digital signal processor (DSP) while playing the disk at N× speed;
   (c) determining whether the measured CES generation time t is smaller than a first reference time $t_1$;
   (d) playing the disk at N× speed if it is determined in step (c) that the CES generation time t is smaller than the first reference time $t_1$;
   (e) determining whether the CES generation time t is equal to or greater than the first reference time $t_1$ and smaller than a second reference time $t_2$ if it is determined in step (c) that the CES generation time t is equal to or greater than the first reference time $t_1$;
   (f) determining whether the CES generation time t is equal to or greater than an (n−1)th reference time $t_1$ and smaller than an nth reference time $t_n$ after an algorithm is sequentially repeated for all reference times between $t_1$ and $t_n$;
   (g) playing the disk at 2× speed if it is determined in step (f) that the CES generation time t is equal to or greater than the (n−1)th reference time $t_{n-1}$ and smaller than the nth reference time $t_n$; and
   (h) stopping the playing of the disk if it is determined in step (f) that the CES generation time t is equal to or greater than the nth reference time $t_n$.

2. A method of driving a CD-ROM drive as claimed in claim 1, wherein N=4 such that the disk is played at 4× speed in said step (b).

3. A method of driving a CD-ROM drive as claimed in claim 1, further comprising the step of pre-storing a program for setting the initial speed for respective disks to be inserted into the disk drive to N× speed, before said step (a).

4. A method of driving a CD-ROM drive for playing a disk, comprising the steps of:
   (a) setting an initial driving speed of the disk to N× speed, where N=2n and n is a positive integer;
   (b) measuring a length of time t required to generate a correction error signal (CES) of a digital signal processor (DSP) while playing the disk at N× speed;
   (c) playing the disk at N× speed if the CES generation time t is smaller than a first reference time $t_1$;
   (d) playing the disk at 2× speed if the CES generation time t is equal to or greater than an (n−1)th reference time $t_{n-1}$ and smaller than an nth reference time $t_n$; and
   (e) stopping the playing of the disk if the CES generation time t is equal to or greater than the nth reference time $t_n$.

5. A method of driving a CD-ROM drive as claimed in claim 4, wherein N=4 such that the disk is played at 4× speed in said step (b).

6. A method of driving a CD-ROM drive as claimed in claim 4, further comprising the step of pre-storing a program for setting the initial speed for respective disks to be inserted into the disk drive to N× speed, before said step (a).

7. A method of driving a CD-ROM drive for playing a disk, comprising the steps of:
   (a) setting an initial driving speed of the disk to N× speed, where N=2n and n is a positive integer;
   (b) measuring a length of time t required to generate a correction error signal (CES) of a digital signal processor (DSP) while playing the disk at N× speed;
   (c) playing the disk at N× speed if the CES generation time t is smaller than a first reference time $t_1$;
   (d) playing the disk at (N−2)× speed if the CES generation time t is equal to or greater than the first reference time $t_2$ and smaller than a second reference time $t_3$;
   (e) playing the disk at (N−4)× speed if the CES generation time t is equal to or greater than the second reference time $t_2$ and smaller than a third reference time $t_3$;
   (f) playing the disk at 2× speed if the CES generation time t is equal to or greater than an (n−1)th reference time $t_{n-1}$ and smaller than an nth reference time $t_n$; and
   (g) stopping the playing of the disk if the CES generation time t is equal to or greater than the nth reference time $t_n$.

8. A method of driving a CD-ROM drive as claimed in claim 7, wherein N=8 such that the disk is played at 8× speed in said step (b).

9. A method of driving a CD-ROM drive as claimed in claim 7, further comprising the step of pre-storing a program for setting the initial speed for respective disks to be inserted into the disk drive to N× speed, before said step (a).

10. A method of driving a CD-ROM drive for playing a disk, comprising the steps of:

(a) setting an initial driving speed of the disk to N× speed, where N=2n and n is a positive integer;

(b) measuring a length of time t required to generate a correction error signal (CES) of a digital signal processor (DSP) while playing the disk at N× speed;

(c) playing the disk at N× speed if the CES generation time t is smaller than a first reference time $t_1$;

(d) playing the disk at (N−2)× speed if the CES generation time t is equal to or greater than the first reference time $t_1$ and smaller than a second reference time $t_2$;

(e) playing the disk at 2× speed if the CES generation time t is equal to or greater than an (n−1)th reference time $t_{n-1}$ and smaller than an nth reference time $t_n$; and (f) stopping the playing of the disk if the CES generation time t is equal to or greater than the nth reference time $t_n$.

11. A method of driving a CD-ROM drive as claimed in claim 10, wherein N=6 such that the disk is played at 6× speed in said step (b).

12. A method of driving a CD-ROM drive as claimed in claim 10, further comprising the step of pre-storing a program for setting the initial speed for respective disks to be inserted into the disk drive to N× speed, before said step (a).

13. A method of driving a CD-ROM drive for playing a disk, comprising the steps of:

(a) setting an initial driving speed of the disk to N× speed, where N=2n and n is a positive integer;

(b) measuring a length of time t required to generate a correction error signal (CES) of a digital signal processor (DSP) while playing the disk at N× speed;

(c) playing the disk at 2× speed if the CES generation time t is equal to or greater than an (n−1)th reference time $t_{n-1}$ and smaller than an nth reference time $t_n$; and (d) stopping the playing of the disk if the CES generation time t is equal to or greater than the nth reference time $t_n$.

14. A method of driving a CD-ROM drive as claimed in claim 13, wherein N=2 such that the disk is played at 2× speed in said step (b).

15. A method of driving a CD-ROM drive as claimed in claim 13, further comprising the step of pre-storing a program for setting the initial speed for respective disks to be inserted into the disk drive to N× speed, before said step (a).

16. A method of driving a CD-ROM drive for playing a disk, comprising the steps of:

(a) setting an initial driving speed of the disk to N× speed, where N=2n and n is a positive integer;

(b) measuring a length of time t required to generate a correction error signal (CES) of a digital signal processor (DSP) while playing the disk at N× speed;

(c) setting a counting value (CV) to a value of 1;

(d) playing the disk at N× speed if the CES generation time t is smaller than reference time $t_{CV}$, and if N is greater than 2;

(e) adding a value of 1 to the CV;

(f) playing the disk at (N−2(CV)+2)× speed if the CES generation time t is equal to or greater than reference time $t_{CV-1}$ and smaller than reference time $t_{CV}$, and if N is greater than 4;

(g) repeating steps (e) and (f) if CV<(n−1) (h) playing the disk at 2× speed if the CES generation time t is equal to or greater than reference time $t_{n-1}$ and smaller than reference time $t_n$;

(i) stopping the playing of the disk if the CES generation time t is equal to or greater than reference time.

17. A method of driving a CD-ROM drive as claimed in claim 16, further comprising the step of pre-storing a program for setting the initial speed for respective disks to be inserted into the disk drive to N× speed, before said step (a).

* * * * *